US008814186B1

(12) United States Patent
Rinda (10) Patent No.: US 8,814,186 B1
(45) Date of Patent: Aug. 26, 2014

(54) MECHANISM FOR CAUSING LEANING OF A MOTORIZED REVERSE TRICYCLE IN THE DIRECTION OF TURNING

(71) Applicant: Adiva Co., Ltd., Kaohsiung (TW)

(72) Inventor: Komasato Rinda, Kaohsiung (TW)

(73) Assignee: Adiva Co., Ltd., Kaohsiung (TW)

( * ) Notice: Subject to any disclaimer, the term of this patent is extended or adjusted under 35 U.S.C. 154(b) by 0 days.

(21) Appl. No.: 13/928,342

(22) Filed: Jun. 26, 2013

(51) Int. Cl.
*B62K 5/06* (2006.01)
*B62K 21/00* (2006.01)

(52) U.S. Cl.
CPC .. *B62K 21/00* (2013.01); *B62K 5/06* (2013.01)
USPC ............. 280/93.504; 280/5.509; 280/124.135

(58) Field of Classification Search
CPC .............. B62K 5/05; B62K 5/06; B62K 5/10; B62K 21/00
USPC .............. 280/93.504, 93.505, 5.509, 124.135
See application file for complete search history.

(56) References Cited

U.S. PATENT DOCUMENTS

| | | | | | |
|---|---|---|---|---|---|
| 5,447,321 | A | * | 9/1995 | Hurlburt et al. | 280/93.504 |
| 7,931,286 | B2 | * | 4/2011 | Melcher | 280/124.103 |
| 8,162,328 | B2 | * | 4/2012 | Horiguchi et al. | 280/5.509 |
| 8,262,111 | B2 | * | 9/2012 | Lucas | 280/124.103 |
| 8,485,541 | B2 | * | 7/2013 | Pozio | 280/124.136 |
| 8,602,421 | B2 | * | 12/2013 | Mercier | 280/5.509 |
| 2008/0012262 | A1 | * | 1/2008 | Carabelli et al. | 280/124.106 |
| 2008/0258415 | A1 | * | 10/2008 | Melcher | 280/124.103 |
| 2014/0124286 | A1 | * | 5/2014 | Hayashi | 180/400 |

* cited by examiner

*Primary Examiner* — Drew Brown (57) ABSTRACT

A steering mechanism of a reverse tricycle in combination includes a structural member including a central opening, two upper openings, and two lower openings; two upper link arm assemblies pivotably secured to the upper openings respectively; two lower link arm assemblies pivotably secured to the lower openings respectively; a shock absorber disposed through the central opening and having both ends pivotably secured to the lower link arm assemblies respectively; and two pivot assemblies wherein one pivot assembly pivotably secured to a hub of one front wheel of the tricycle and an other pivot assembly pivotably secured to a hub of an other front wheel of the tricycle. The steering mechanism causes leaning of the reverse tricycle in the direction of turning.

3 Claims, 8 Drawing Sheets

MECHANISM FOR CAUSING LEANING OF A MOTORIZED REVERSE TRICYCLE IN THE DIRECTION OF TURNING

BACKGROUND OF THE INVENTION

1. Field of the Invention

The invention relates to steering mechanisms and more particularly to a mechanism for, during turning, causing leaning of a motorized reverse tricycle in the direction of turning.

2. Description of Related Art

Recumbent tadpole or reverse tricycle is a recumbent design with two steered wheels at the front and one driven wheel at the back. Steering is either through a single handlebar linked with tie rods to the front wheels' stub axle assemblies or with two handlebars each bolted to a steering tube, usually through a bicycle-type headset and connected to a stub axle assembly. A single tie rod connects the left and right axle assemblies.

There is a conventional three-wheeled vehicle steering and suspension system including two support assemblies for two opposed front wheels pivotably mounted at opposite sides of the frame and operatively connected by a hydraulic cylinder arrangement actuated by the vehicle steering linkage for inducing opposed pivotal movement of the support assemblies during vehicle turning to cause leaning of the vehicle in the direction of turning. A biasing arrangement provides the operative connection between the hydraulic cylinder and the support assemblies for transmitting lean-actuating reciprocating movement of the hydraulic cylinder to the support assemblies while permitting independent pivotal movements thereof.

Notwithstanding the prior art, the invention is neither taught nor rendered obvious thereby.

SUMMARY OF THE INVENTION

It is therefore one object of the invention to provide a steering mechanism of a reverse tricycle in combination comprising a structural member including a central opening, two upper openings, and two lower openings; two upper link arm assemblies pivotably secured to the upper openings respectively; two lower link arm assemblies pivotably secured to the lower openings respectively; a shock absorber disposed through the central opening and having both ends pivotably secured to the lower link arm assemblies respectively; a frame secured to the structural member; and two pivot assemblies wherein one pivot assembly pivotably secured to a hub of one front wheel of the tricycle and an other pivot assembly pivotably secured to a hub of an other front wheel of the tricycle.

The above and other objects, features and advantages of the invention will become apparent from the following detailed description taken with the accompanying drawings.

DETAILED DESCRIPTION OF THE INVENTION

Referring to FIGS. 1 to 5, a mechanism for, during turning, causing leaning of a motorized reverse tricycle in the direction of turning in accordance with the invention is shown. The tricycle has two steered wheels 2, 2' at the front and one driven wheel (not shown) at the back. The mechanism comprises the following components as discussed in detail below.

Figure 1:
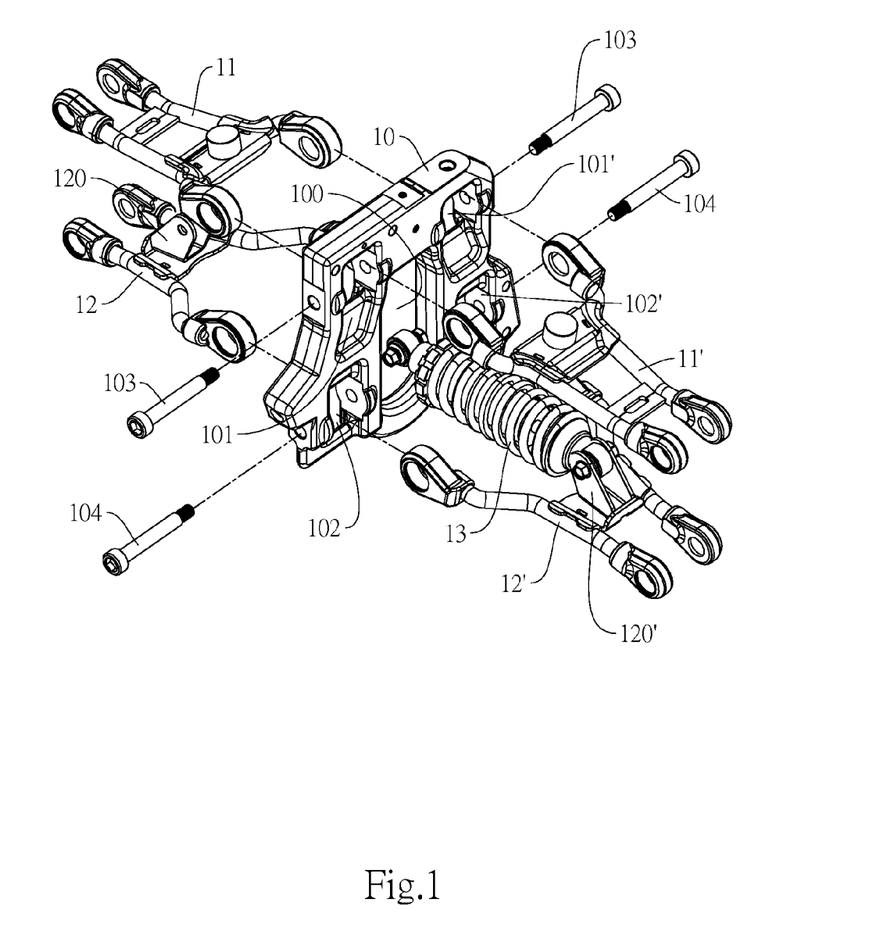
FIG. 1 is an exploded view of a mechanism for causing leaning of a motorized reverse tricycle in the direction of turning according to the invention.
Figure 2:
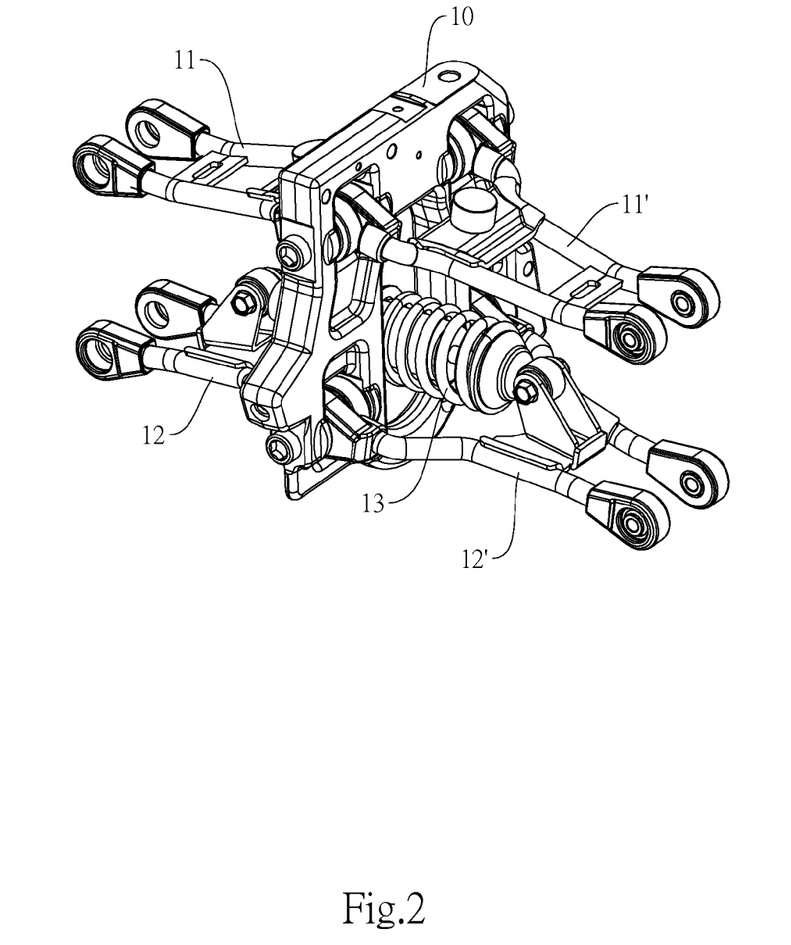
FIG. 2 is a perspective view of the assembled mechanism.

A substantially rectangular structural member 10 comprises a central opening 100, two upper openings 101, 101', and two lower openings 102, 102'. Two upper link arm assemblies 11, 11' are pivotably secured to the upper openings 101, 101' by using two upper pins 103 respectively. One upper link arm assembly 11 includes a cushioning member 110 on a top and the other upper link arm assembly 11' includes a cushioning member 110' on a top. Likewise, two lower link arm assemblies 12, 12' are pivotably secured to the lower openings 102, 102' by using two lower pins 104 respectively. One lower link arm assembly 12 includes a bifurcation 120 and the other lower link arm assembly 12' includes a bifurcation 120'. A shock absorber 13 is disposed through the central opening 100 and has both ends pivotably secured to the bifurcations 120, 120' respectively.

A frame 3 is secured to the structural member 10 by using two fasteners 30. A first pivot assembly 14 includes two first pivots 140 for pivotably securing a hub 20 of one front wheel 2 to the first pivot assembly 14, a second pivot 141 for pivotably securing a hub 20 of one front wheel 2 to one upper link arm assembly 11, and a third pivot 142 for pivotably securing the hub 20 of one front wheel 2 to one lower link arm assembly 12. Likewise, a second pivot assembly 14' includes two first pivots 140' for pivotably securing a hub 20' of the other front wheel 2' to the second pivot assembly 14', a second pivot 141' for pivotably securing a hub 20' of the other front wheel 2' to the other upper link arm assembly 11', and a third pivot 142' for pivotably securing the hub 20' of the other front wheel 2' to the other lower link arm assembly 12'.

Figure 3:
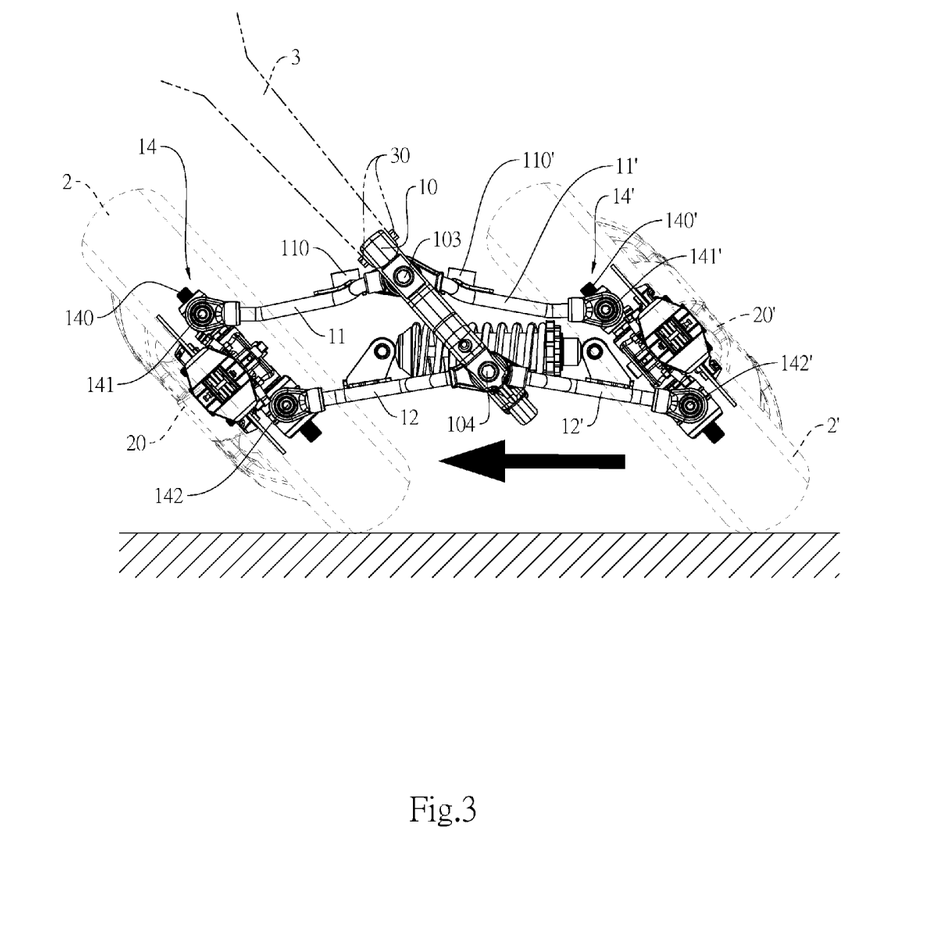
FIG. 3 is a schematic front view of a portion of a motorized reverse tricycle incorporating the mechanism, where during turning the mechanism causes leaning of the motorized reverse tricycle in the direction of turning.

As shown in FIG. 3 specifically, in response to a left turning of the vehicle, the structural member 10 including the upper link arm assemblies 11, 11' and the lower link arm assemblies 12, 12' lean toward a center of turning circle. And in turn, both the front wheels 2, 2' lean toward the center of turning circle with the cooperation of the first and second pivot assemblies 14, 14'. The provision of the cushioning members 110, 110' prevents the frame 3 from contacting either one of the upper link arm assemblies 11, 11' when making a turn. As a result, the vehicle is allowed to follow the desired course.

Figure 4:
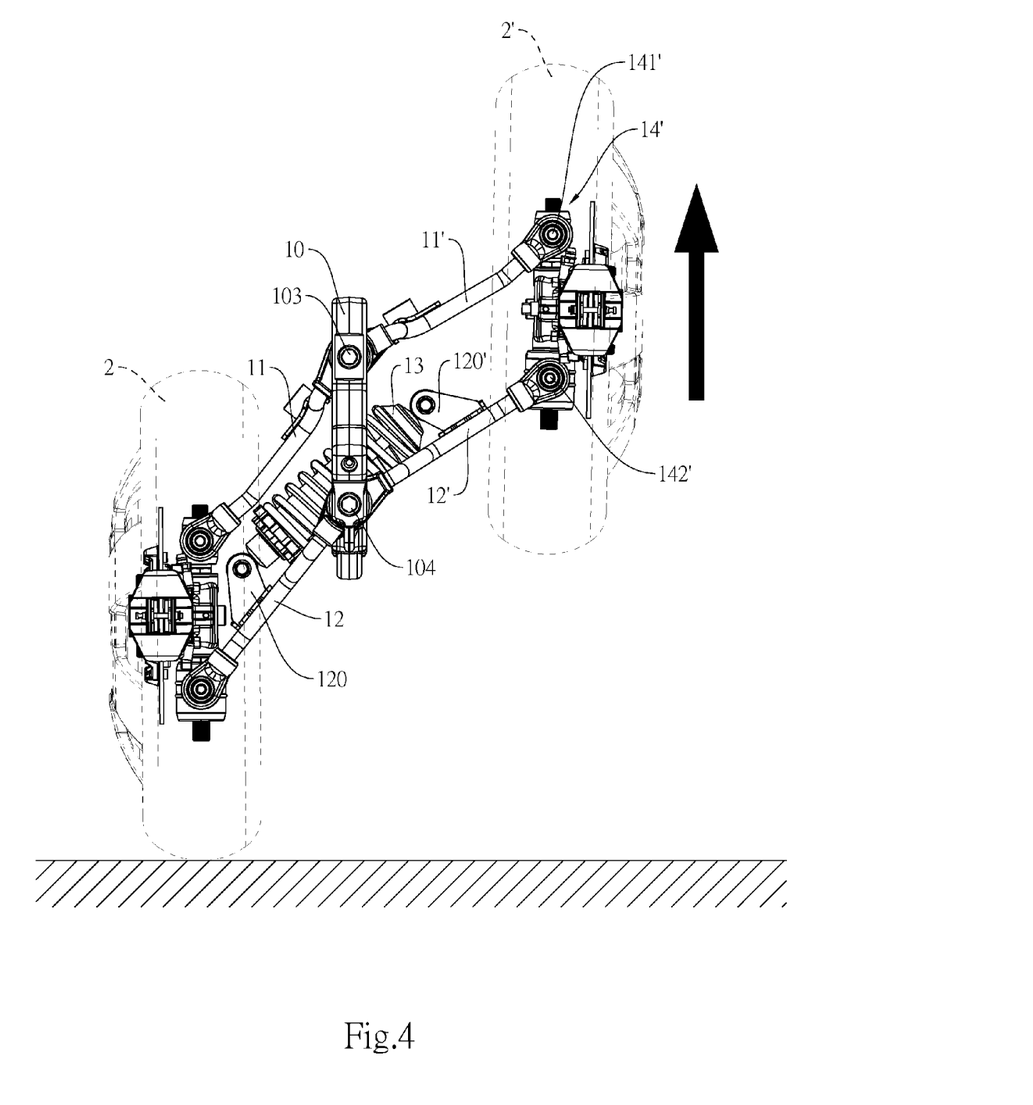
FIG. 4 is a view similar to FIG. 3 showing one front wheel being lifted when the vehicle experiencing irregularities in driving.

As shown in FIG. 4 specifically, in response to the vehicle experiencing irregularities, for example, the other front wheel 2' lifts. Also, the shock absorber 13 is compressed to absorb shock and jarring of the vehicle. Thus, a minimum impact to one upper link arm assembly 11 and one lower link arm assembly 12 can be carried out. Further, the shock absorber 13 releases its stored energy after the vehicle passing the irregularities. This can bring a degree of comfort to the driver.

Figure 5:
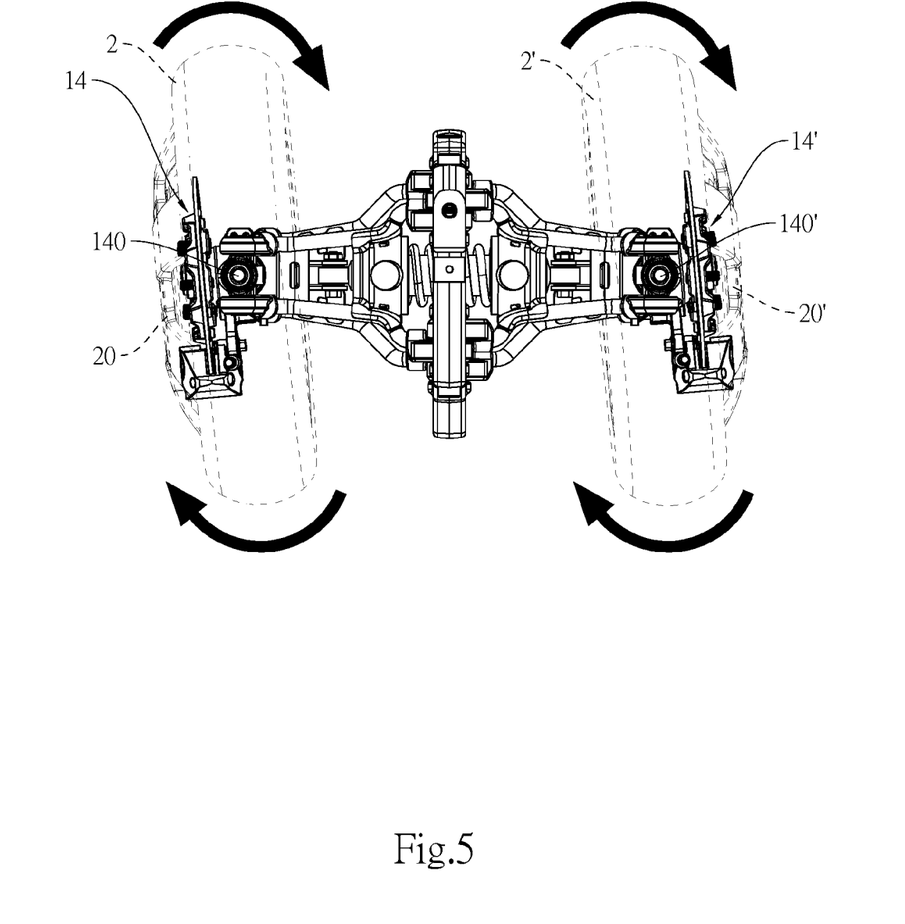
FIG. 5 is a view similar to FIG. 3 showing a pivotal movement of each front wheel in response to the vehicle turning or experiencing irregularities in driving.

As shown in FIG. 5 specifically, the hub 20 (i.e., one front wheel 2) may clockwise pivot about the first pivots 140 and the hub 20' (i.e., the other front wheel 2') may clockwise pivot about the first pivots 140' respectively in response to the vehicle turning or experiencing irregularities in driving. This can further bring a degree of comfort to the driver.

Figure 6:
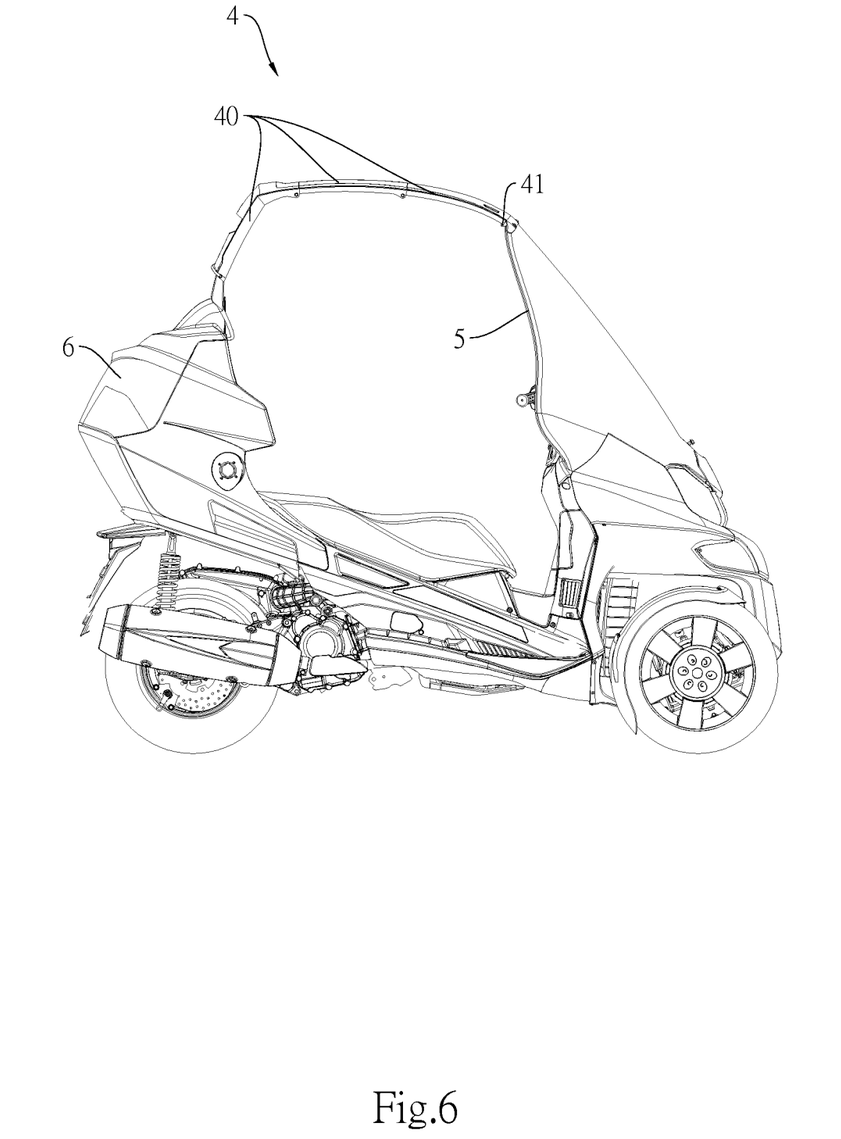
FIG. 6 is a side elevation of the motorized reverse tricycle having a collapsible roof according to the invention.
Figure 7:
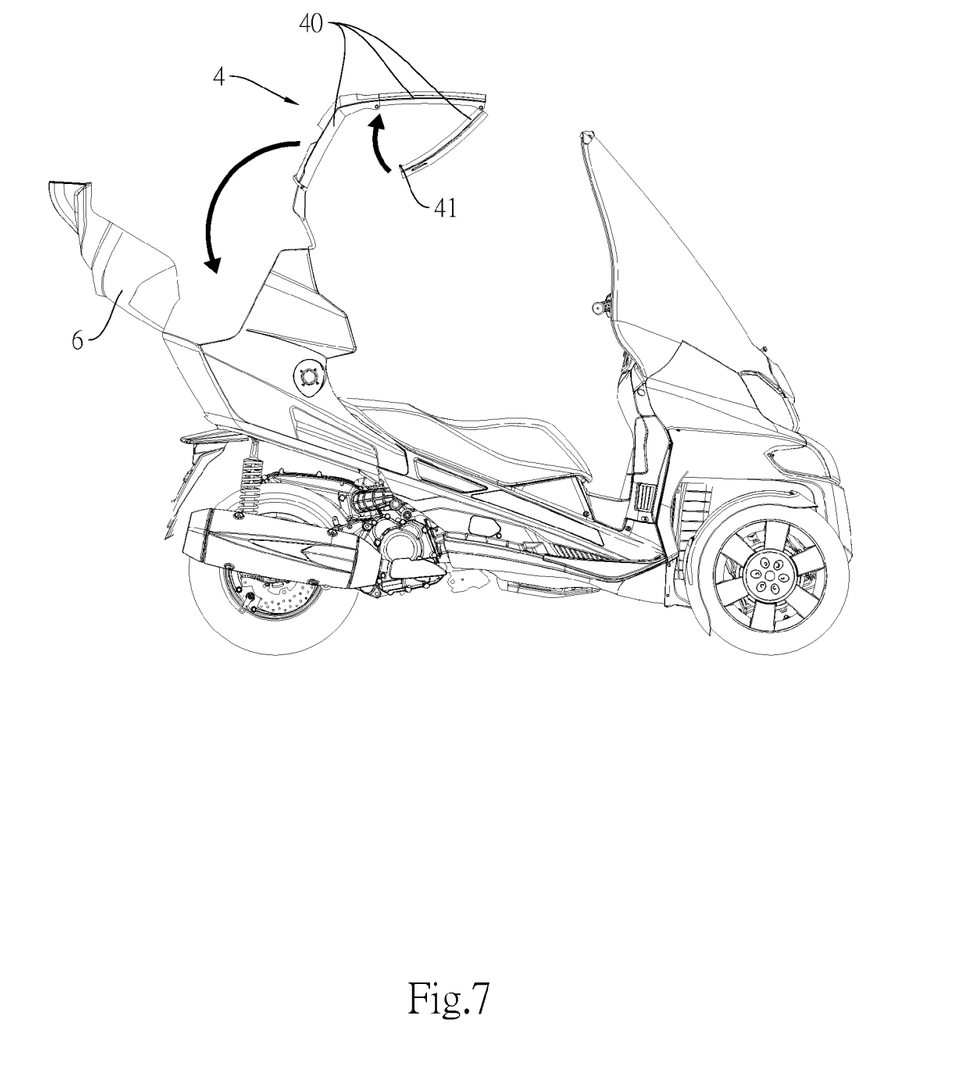
FIG. 7 is a view similar to FIG. 6 showing the roof being folded and the trunk being opened.
Figure 8:
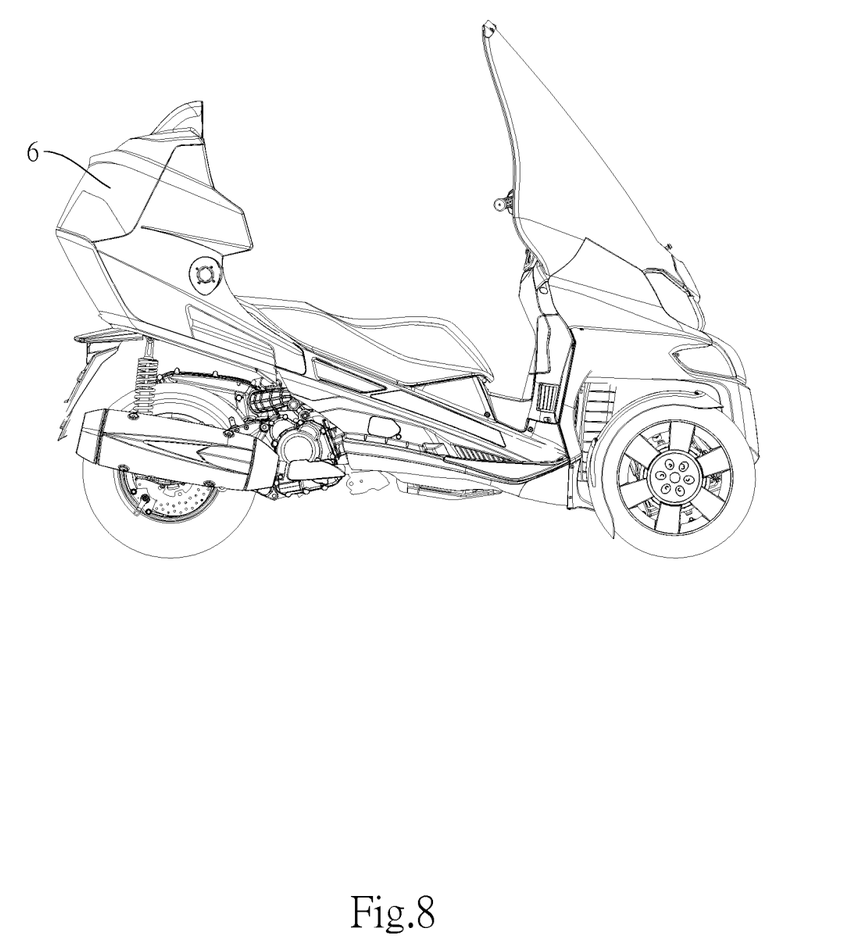
FIG. 8 is a view similar to FIG. 6 showing the roof being stored in the trunk.

Referring to FIGS. 6 to 8, the motorized reverse tricycle is further provided with a collapsible roof 4 including a plurality of hingedly connected sections 40, and a releasable fastening member 41 secured to a top of a windscreen 5. A rear end of the roof 4 is connected to a top of a trunk 6. The roof 4 can be folded (as indicated by arrows) and stored in the trunk 6. This is a storage saving design.

While the invention has been described in terms of preferred embodiments, those skilled in the art will recognize that the invention can be practiced with modifications within the spirit and scope of the appended claims.

What is claimed is:

1. A steering mechanism of a reverse tricycle in combination comprising:
   a structural member including a central opening, two upper openings, and two lower openings;
   two upper link arm assemblies pivotably secured to the upper openings respectively;
   two lower link arm assemblies pivotably secured to the lower openings respectively;
   a shock absorber disposed through the central opening and having both ends pivotably secured to the lower link arm assemblies respectively; and
   two pivot assemblies wherein one pivot assembly is pivotably secured to a hub of one front wheel of the reverse tricycle and an other pivot assembly is pivotably secured to a hub of an other front wheel of the reverse tricycle.

2. The steering mechanism of claim 1, wherein each of the upper link arm assemblies include a top cushioning member.

3. The steering mechanism of claim 1, wherein each of the pivot assemblies include two first pivots for pivotably securing to the hub of one front wheel, a second pivot for pivotably securing the hub of one front wheel to one upper link arm assembly, and a third pivot for pivotably securing the hub of one front wheel to one lower link arm assembly.

* * * * *